(12) United States Patent
Hebblethwaite

(10) Patent No.: US 8,702,853 B2
(45) Date of Patent: *Apr. 22, 2014

(54) TANK WITH CONTAINMENT CHAMBER AND GAS SCRUBBER

(71) Applicant: Russell Hebblethwaite, Union Bay (CA)

(72) Inventor: Russell Hebblethwaite, Union Bay (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,748

(22) Filed: Oct. 17, 2013

(65) Prior Publication Data
US 2014/0047977 A1 Feb. 20, 2014

Related U.S. Application Data

(63) Continuation-in-part of application No. 13/342,291, filed on Jan. 3, 2012, now Pat. No. 8,580,020.

(60) Provisional application No. 61/428,965, filed on Dec. 31, 2010.

(51) Int. Cl.
*B01D 47/00* (2006.01)

(52) U.S. Cl.
USPC ............................ 96/243; 220/565; 220/567.2

(58) Field of Classification Search
None
See application file for complete search history.

(56) References Cited

U.S. PATENT DOCUMENTS

| | | | |
|---|---|---|---|
| 5,971,009 A * | 10/1999 | Schuetz et al. | 137/312 |
| 2011/0036241 A1 * | 2/2011 | Hebblethwaite | 96/193 |

* cited by examiner

*Primary Examiner* — Duane Smith
*Assistant Examiner* — Phillip Shao

(57) ABSTRACT

The invention relates to a fluid storage tank having an interior volume and a floor and having an internal spill containment chamber comprising a vent gas scrubbing apparatus or scrubber. The chamber may be defined by a containment wall which completely separates the chamber from the tank interior volume. The containment wall may comprise an exterior portion which extends beyond the tank wall. The scrubber is disposed within the chamber and comprises a gas inlet passing through the containment wall into the tank interior volume, a gas outlet for venting scrubbed gases, and a gas scrubbing chemical storage and circulation system.

13 Claims, 2 Drawing Sheets

US 8,702,853 B2

TANK WITH CONTAINMENT CHAMBER AND GAS SCRUBBER

CROSS REFERENCE TO RELATED APPLICATIONS

This application is a continuation of U.S. patent application Ser. No. 13/342,291 filed on Jan. 3, 2012 which claims the priority benefit of U.S. Provisional Application No. 61/428,965 filed on Dec. 31, 2010 entitled "Tank with Containment Chamber and Gas Scrubber", the contents of which are incorporated herein by reference.

FIELD OF THE INVENTION

The invention relates to an above-ground fluid storage tank with a valve and spill containment system and a gas scrubber.

When oil and/or natural gas are extracted from the ground, it is often extracted along with volumes of water mixed with particulate solids such as sand. The gas is separated from the mixture and the liquids such as oil and water is diverted to a storage tank for temporary storage in the field. Although these fluid storage tanks may vary in size from 25 barrel capacity to over 100,000 barrel capacity, a common size tank is in the 750 to 1000 barrel range. Such tanks are normally cylindrical, have a radius of between about 4 feet and 10 feet.

Above-ground fluid storage tanks create risks of environmental damage. There is nearly always spillage from outlet valves or the loading spout whenever a hose is connected or disconnected. Also, these tanks are known to overflow if they are not emptied on a regular basis. The overflow occurs through vents and thief hatches normally provided at the top of the tank and the fluid runs down the exterior of the tank onto the ground.

One cumbersome prior art solution to the freeze-up problem is to wrap these valves in insulation, to prevent freezing. However, this insulation may come loose and further, deteriorates quickly as it becomes saturated with oil and salt water. The salt water can cause corrosion problems with the valve and the tank. Also, insulating the valve does not always ensure the valve does not freeze in very cold weather.

Another prior art solution is to build a cabinet around the valve on the exterior of the tank. This cabinet often does not have a floor; it is open to the ground. However, this solution also does not prevent freezing of the valve in very cold weather and provides only limited containment of spills and leakage.

The produced fluids may contain sour gas (hydrogen sulphide) which may accumulate in the storage tanks to concentrations which may be harmful to persons and the environment. In addition, the level of volatile organic compounds (VOC) in the tank headspace may also be cause for concern. Oil and condensate storage tank emissions at wellhead and gathering sites are composed of working losses, breathing losses, and flashing losses. Working losses are vapors that are displaced from a tank during the filling cycle and breathing losses are vapors that are produced in response to diurnal temperature changes. Flashing losses are vapors that are released when a liquid with entrained gases (also referred to as solution gas) experiences a pressure drop, as during the transfer of liquid hydrocarbons from a wellhead or separator to a storage tank that is vented to the atmosphere. The tank headspace is required to be vented or flared to prevent the buildup of explosive gaseous mixtures, however, there is significant concern that the VOCs themselves, or flaring combustion products, are harmful when released into the environment.

For these reasons, it is known to vent storage tanks into vent gas scrubbers. However, these vent gas scrubbers can suffer from the freezing and spillage problems described above.

SUMMARY OF INVENTION

The present invention relates to a fluid storage tank having a tank wall defining an interior volume, the tank comprising:
(a) an internal spill containment chamber defined by a containment wall which completely separates the chamber from the tank interior volume, and an exterior wall;
(b) a scrubber disposed within the chamber and comprising a gas inlet passing through the containment wall into the tank interior volume, a gas outlet for venting scrubbed gases, a gas scrubbing chemical storage, and an interface for contacting gases from the tank interior volume with the gas scrubbing chemical.

In one aspect, the invention may comprise a method of treating gases from within the headspace of a fluid storage tank comprising an internal spill containment chamber defined by a containment wall which completely separates the chamber from the tank interior volume, and an exterior wall, the method comprising the steps of:
(a) directing gases from the headspace into a scrubber disposed within the containment chamber;
(b) treating the gases within the scrubber to remove unwanted gas components; and
(c) venting the scrubbed gases to the atmosphere.

In another aspect, the invention may comprise a method of offloading a fluid storage tank comprising an internal spill containment chamber defined by a containment wall which completely separates the chamber from the tank interior volume, and an exterior wall, with a tanker truck, the method comprising the steps of:
(a) directing displaced gases from the tanker truck into a scrubber disposed within the containment chamber;
(b) treating the gases within the scrubber to remove unwanted gas components; and
(c) venting the scrubbed gases to the atmosphere.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

Figure 1:
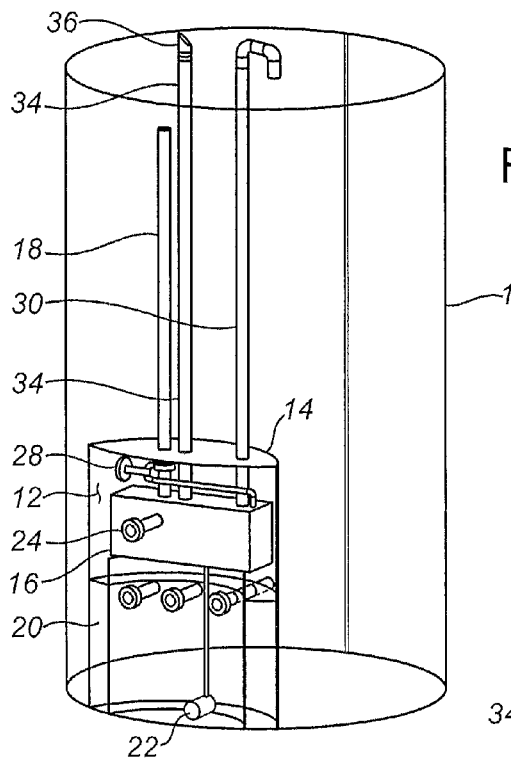
FIG. 1 is a pictorial view of an oil storage tank with a spill containment chamber and enclosed scrubber.

The present invention provides for fluid storage tank having an internal spill containment chamber and an integrated vent gas scrubber. In particular, the present invention is directed at above-ground fluid storage tanks that can be used for temporary or permanent storage of fluids produced during oil and gas production. When describing the present invention, all terms not defined herein have their common art-recognized meanings.

As referred to herein, undesirable gases which may be controlled by the scrubbers of the present invention include hydrogen sulphide, volatile organic compounds including toxic compounds such as benzene, toluene, ethyl benzene and xylene, acid gas vapours, mercaptans and other sulfur compounds.

Above-ground fluid storage tanks with spill containment chambers are known. The Figures depict a fluid storage tank (10) having a spill containment chamber (12), which is defined by containment wall (14) which completely separates the chamber from the interior volume of the tank. In one embodiment, the containment wall (14) attaches to the interior of the tank wall, such that the entire chamber is contained with the storage tank volume. In one embodiment, the containment wall may protrude from the tank periphery to expose an exterior portion (not shown) of the containment wall (14). The exterior portion may be a continuation of the interior portion, or may be attached to the interior portion or to the tank wall to create an extension of the spill containment chamber. In any configuration, what is important is that the containment chamber be enclosed, with an exterior access door or panel, and that at least a major portion of the chamber, and preferably the entire chamber, is contained within the storage tank (10) volume, as is shown in the Figures.

The chamber (12) encloses a vent gas scrubber (16), which is well-known in the art. The scrubber (16) comprises a tank vapour inlet (18) which is exposed to the headspace within the tank. Gases from the tank may enter the scrubber through the inlet (18). Gases are scrubbed within the scrubber (16) using well-known and conventional techniques, and leave the scrubber via the gas outlet (30). Compact gas scrubbers for various gases are commercially available. Commercially available units designed to remove hydrogen sulfide, benzene, toluene, xylene, ethyl benzene, heavy hydrocarbons, acid gases, as well as other sulphur compounds are readily available. Chemical substances used to scrub or absorb the gases are well known, and may be stored in a chemical storage tank (20) within the chamber (12). In one embodiment, if the chemical is in the form of a liquid, it may be pumped through the scrubber by a circulation pump (22). The circulation pump (22) may also be used to change out the chemical stored in the storage tank (20). Because the chemical in stored in a separate chemical tank within the containment chamber, the storage tank can be moved from location to location without removing the chemical.

Figure 3:
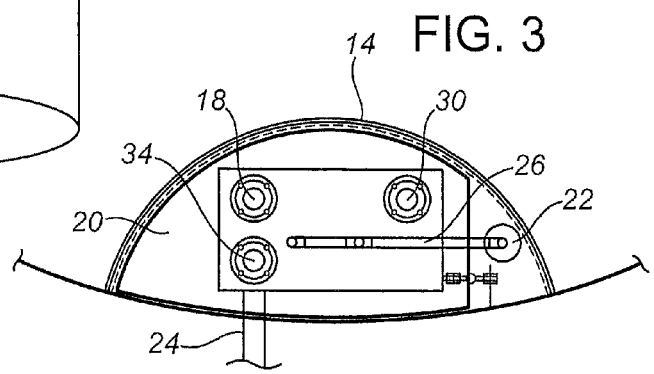
FIG. 3 is a top plan view of one embodiment of the chamber.
Figure 2:
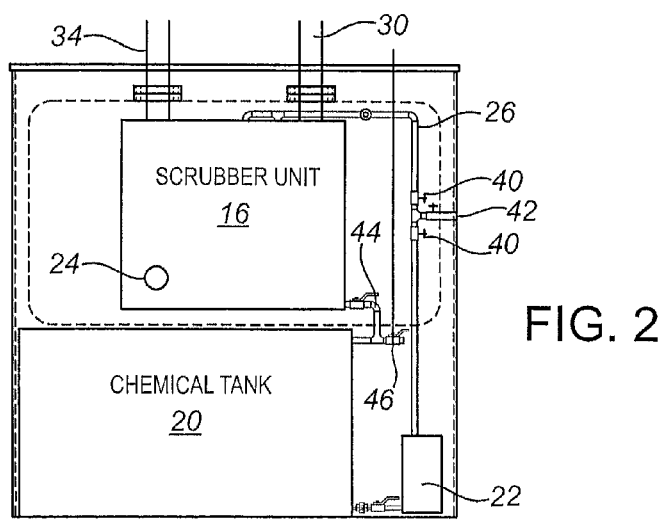
FIG. 2 is a side view of one embodiment of the chamber.

In FIG. 1, the chemical supply pump (22) is more centrally located within the chamber, while in alternative embodiments, such as shown in FIGS. 2 and 3, the chemical pump (22) is located to one side. Supply piping (26) may include isolation valves (40) and a T-fitting (42) for pumping off spent chemical solution. A chemical drain fitting (44) with a fill valve (46) returns chemical to the storage tank (20) from the scrubber, and permits filling of the storage tank (20).

In one embodiment, the chemical supply pump (22) draws fluid from the bottom of the storage tank (20) to allow fluid pressure to easily prime the pump.

Figure 4:
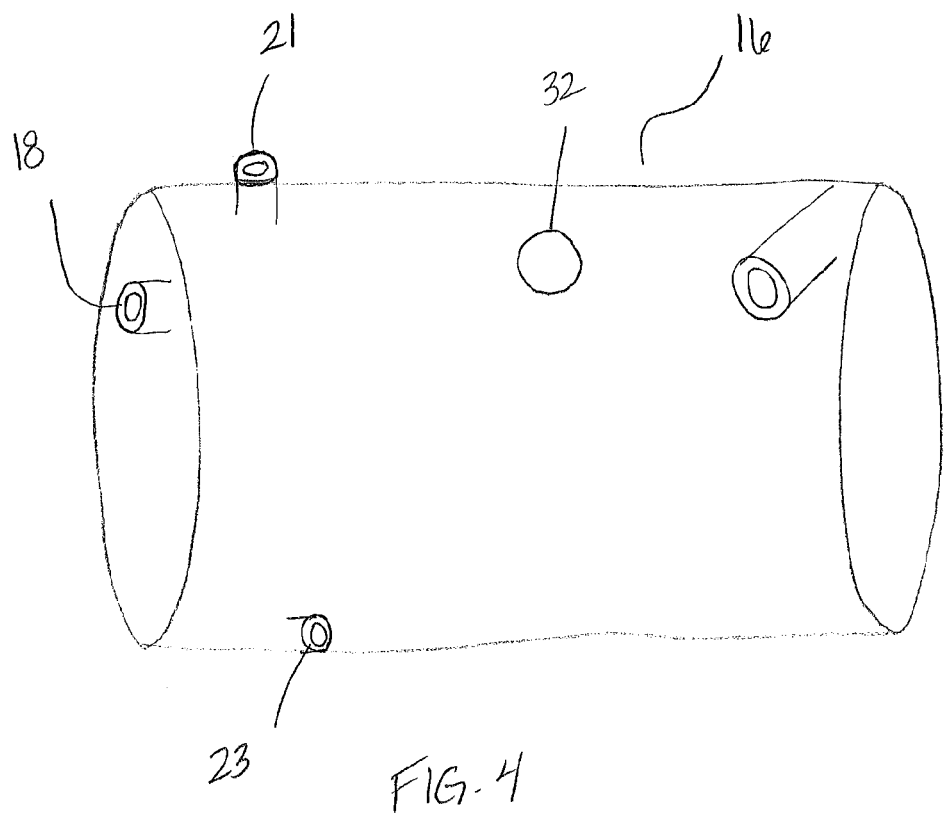
FIG. 4 is a schematic diagram of one embodiment of a scrubber unit to be installed in one embodiment of the chamber.

In an alternative embodiment, as shown in FIG. 4, the scrubber unit (16) is a self-contained unit which does not have a separate chemical storage tank. The chemical scrubber may be introduced into the unit via chemical fill opening (21) and when spent, periodically removed through drain (23). If the chemical is in solid pellet form, the drain (23) may comprise an access hatch allowing for removal of the spent solid chemical from a solids receptacle within the scrubber. As the tank (10) fills, gases in the headspace will be directed into and treated in the scrubber.

A tank truck inlet connection (24) may be provided to allow tank trucks to tie into the system, when pumping off the tank (10). As the liquids are drawn from the storage tank into the truck, gases or vapors from the tank truck are pushed or drawn into the scrubber through the inlet connection (24), treated within the scrubber, and vented to the atmosphere through vent pipe (30). As a result, the amount of gas which may contain undesirable gas components escaping to the atmosphere is minimized. The tank truck inlet may be connected to a vapor load riser that runs to the edge of the containment. A gas inlet switching valve may be used to close off the tank vapour inlet (18) and isolate the scrubber (16) from the tank headspace.

The scrubbed gases exit the scrubber (16) through scrubber vent pipe (30), which in one embodiment, passes through the tank (10) and tank roof to vent to the atmosphere.

In one embodiment, the scrubber may comprise a pressure relief system, such as a relief valve. In one embodiment, the pressure relief system comprises a rupture disc discharge system (32). A rupture disc comprises a thin diaphragm held between flanges and calibrated to burst at a specified static inlet pressure. Unlike relief valves, rupture discs cannot reseal when the pressure declines. Once the disc ruptures, gases within the scrubber (16) may exit through the disc and through the rupture disc riser pipe (34) which extends through the tank roof, and terminates with a rupture disc indicator (36). The indicator (36) comprises any mechanism which provides a visual indicator that gas pressure has escaped through the riser pipe (34). Thus, any personnel approaching the tank will be visually alerted to the fact the rupture disc has burst, and may take appropriate precautions.

Access to the chamber and the scrubber may be provided by a door (not shown) or panel fitted the exterior portion of the containment wall. The door may be insulated to improve heat retention in the chamber.

The types and sizes of valves and fittings to connect the scrubber are conventional and suitable components may be chosen by those skilled in the art.

The chamber (12) may also include valves and outlets configured in a like manner to that described in Applicant's co-owned U.S. Pat. Nos. 5,960,826, 7,165,572 or U.S. patent application Ser. No. 12/855,959, filed Aug. 13, 2010, the entire contents of which are incorporated herein by reference, where permitted. In particular, a tank suckout (50) may be provided to allow removal of the tank contents from a specified level. A chamber suckout pipe (not shown) may be attached to permit removal of any fluid contained in the chamber itself.

The chamber suckout pipe has a first end and a second end where the recovery pipe is attached to the tank suckout and the recovery pipe extends into the chamber. When suction is applied to the end of the fluid outlet and the tank suckout valve is closed and the chamber suckout valve is open, fluid in the chamber may be recovered.

Other optional elements which may be included in the containment chamber may be chosen, such as, without limitation, heating elements such as a catalytic heater, or a high level shutdown switch.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A fluid storage tank having a tank wall defining an interior volume, the tank comprising:

(a) an internal spill containment chamber defined by a containment wall which completely separates the chamber from the tank interior volume, and an exterior wall;

(b) a scrubber disposed within the chamber and comprising a gas inlet passing through the containment wall into the tank interior volume, a gas outlet for venting scrubbed gases, a gas scrubbing chemical storage, and an interface for contacting gases from the tank interior volume with the gas scrubbing chemical.

2. The tank of claim 1 wherein the scrubber comprises a tank truck inlet for scrubbing tank truck gases through the scrubber while pumping off liquid from the storage tank to the tank truck.

3. The tank of claim 1 wherein the chemical storage comprises a liquid storage tank or solids receptacle within the scrubber.

4. The tank of claim 1 wherein the scrubber further comprises a pressure relief system.

5. The tank of claim 4 wherein the pressure relief system comprises a rupture disc and a rupture disc riser pipe and a rupture disc indicator.

6. A method of treating gases from within a headspace of a fluid storage tank comprising an internal spill containment chamber defined by a containment wall which completely separates the chamber from a tank interior volume, and an exterior wall, the method comprising the steps of:

(a) directing gases from the headspace into a scrubber disposed within the containment chamber;

(b) treating the gases within the scrubber to remove unwanted gas components; and (c) venting scrubbed gases to the atmosphere.

7. The method of claim 6 wherein the scrubber comprises a liquid scrubbing chemical.

8. The method of claim 6 wherein the scrubber comprises a solid scrubbing chemical.

9. The method of claim 7 wherein the liquid scrubbing chemical is stored in a liquid storage container and circulated to the scrubber.

10. A method of offloading a fluid storage tank comprising an internal spill containment chamber defined by a containment wall which completely separates the chamber from a tank interior volume, and an exterior wall, with a tanker truck, the method comprising the steps of:

(a) directing displaced gases from the tanker truck into a scrubber disposed within the containment chamber;

(b) treating the gases within the scrubber to remove unwanted gas component; and (c) venting scrubbed gases to the atmosphere.

11. The method of claim 10 wherein the scrubber comprises a liquid scrubbing chemical.

12. The method of claim 10 wherein the scrubber comprises a solid scrubbing chemical.

13. The method of claim 11 wherein the liquid scrubbing chemical is stored in a liquid storage container and circulated to the scrubber.

* * * * *